R. B. SANDS.
INNER LINER FOR CEMENT TILE PALLETS.
APPLICATION FILED MAY 12, 1919.
1,336,865. Patented Apr. 13, 1920.
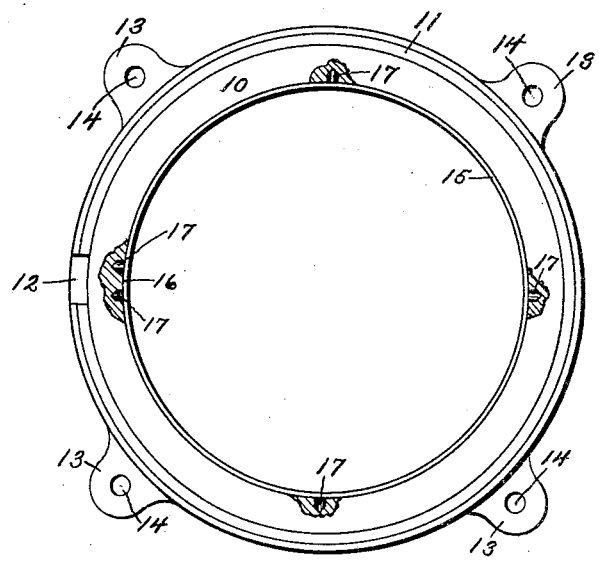
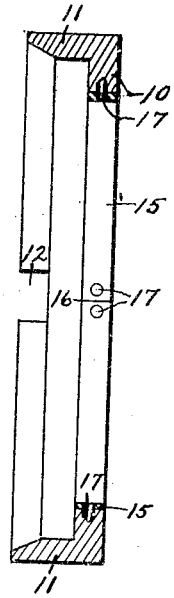
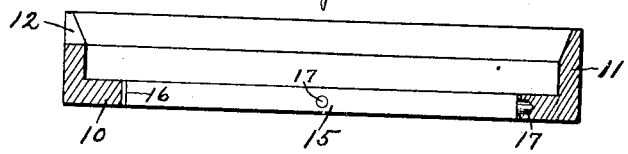
INVENTOR:
R. B. SANDS
By Earl M. Sinclair
Atty.

UNITED STATES PATENT OFFICE.

ROBERT B. SANDS, OF SPENCER, IOWA.

INNER LINER FOR CEMENT-TILE PALLETS.

1,336,865.                     Specification of Letters Patent.     Patented Apr. 13, 1920.

Application filed May 12, 1919. Serial No. 296,620.

*To all whom it may concern:*

Be it known that I, ROBERT B. SANDS, a citizen of the United States of America, and resident of Spencer, Clay county, Iowa, have invented a new and useful Inner Liner for Cement-Tile Pallets, of which the following is a specification.

The object of this invention is to provide a removable and replaceable liner for pallets employed in cement tile machines.

A further object of this invention is to prolong the usefulness of cement-tile pallets by providing a removable and replaceable liner to take the wear of the rotating head employed to finish and shape the interior of the tile.

A further object of this invention is to provide a liner for cement-tile pallets to take the wear of the rotating head of the tile machine, thereby lengthening the life of the pallets and reducing the cost of producing the tile.

My invention consists in the construction, arrangement and combination of elements hereinafter set forth, described in my claims and illustrated by the accompanying drawing, in which—

Figure 1 is a face view, partly in section showing a pallet equipped with my improved liner. Figs. 2 and 3 are cross-sections of the device shown in Fig. 1, taken on lines at right angles to each other.

In the production of cement drain-tile it is customary to employ an annular pallet at each end of each tile, within which pallets a head or ram is rotated at high speed during the pouring of the tile for the purpose of finishing and smoothing the interior thereof. As the pallets ordinarily employed are molded or cast of gray iron and the friction and wear produced by the process described is great, the life of the pallets is naturally quite short, and the expense of replacing them adds materially to the cost of producing the tile. It is my purpose in the present invention to provide a removable and replaceable liner for the annular pallets to receive the actual contact of the rotating head, thus saving wear on the pallets themselves; and to make such inner liners of a relatively tough and wear-resisting substance, which may be accomplished at small cost because of the relatively small size of the liner as compared to the pallet as a whole.

In the drawings herewith I have shown a pallet equipped with one of my improved liners, and such pallet, as shown and as ordinarily employed, consists of an annular plate 10 formed with an integral, right-angled, peripheral flange 11, which preferably is beveled or tapered in its outer portion, and is formed with a notch 12. The plate 10 of the pallet also is formed with a plurality of equally spaced ears 13, formed each with a hole 14, by means of which the pallet may be secured to a suitable support by any desired means. The pallet so formed ordinarily is constructed of iron by molding or casting. It is to be understood that the pallets are of different sizes for the different sizes of drain-tile to be constructed, the inner diameter of the annular plate 10 corresponding to the interior diameter of the tile to be formed therewith, and the inner diameter of the annular flange 11 corresponding to the exterior diameter of said tile. The liner which I have provided is formed of a strip of crucible steel, indicated by the numeral 15, or other suitable material distinguished by toughness and ability to withstand wear by frictional contact. The strip or band 15 is of a width corresponding to the thickness of the annular plate 10 and of a length corresponding substantially to the interior circumference of said plate, so that said band or strip may be curved in the form of a circle with its ends meeting on the line 16, and be inserted within said annular plate. The material of which the band or strip constituting the liner is formed preferably has a resilient characteristic, and when so mounted within the annular pallet plate has a tendency to spring outwardly and so contacts snugly with the inner surface of said plate. A plurality of fastening devices, such as dowel pins 17, are carried by the band or strip constituting the inner liner, and said pins are adapted to be seated in sockets provided therefor in and extending radially of the annular plate 10 and opening to the inner surface thereof. The fit of the dowel pins 17 in their seats preferably is fairly loose, thus facilitating manual removal and replacement of the liners relative to the pallet, and accidental displacement of said liners is resisted by the outward springing tendency of the liner above referred to. One of the dowel pins 17 preferably is located near to each end of the strip or band 15, and the others, to any desired extent and depending somewhat upon the size of the pallet used, are spaced suitably throughout the length of the band or strip.

In use contact of the rotating head of the tile machine, above referred to, is received by the inner surface of the liner 15, rather than by the inner surface of the plate 10, and as said liner is formed of a high quality of material designed to withstand wear from frictional contact, the effects of such contact is lessened and injury to the pallet prevented. The liner may be used until worn substantially through, whereupon it may be removed and replaced and the pallet used indefinitely without injury or wear from the head. As the liner is of small size it may be constructed at slight cost, even when constructed of superior material, and the additional expense of providing such liners is offset many times over by the saving of pallets.

I claim as my invention—

1. The combination with a pallet having a body plate of annular form, of a liner formed of metal of superior wear-resisting qualities removably and replaceably mounted on the interior of said annular body plate, said liner being of a width corresponding approximately to the thickness of said body plate.

2. In a pallet formed with a body plate having a circular opening of uniform diameter therein, the combination with said body plate of a liner formed of a strip of metal having superior wear-resisting qualities, and means for removably and replaceably mounting said strip in and completely covering the surface of said circular opening.

3. In a pallet formed with a body plate having a circular opening of uniform diameter therein, the combination with said body plate of a liner comprising a strip of metal of a width corresponding to the thickness of said plate at the margin of the opening, said strip being of a length corresponding substantially to the circumference of the opening, and means for mounting said strip in and circumferentially of and completely covering the margin of said opening.

4. In a pallet formed with a body plate having a circular opening therein, the combination with said plate of a liner comprising a strip of metal of a length corresponding substantially to the circumference of said opening, said plate also being formed with radially arranged sockets opening to said circular opening, and dowel pins carried by said liner strip and adapted to seat in said radial openings.

Signed at Des Moines, in the county of Polk and State of Iowa, this 11th day of May, 1918.

ROBERT B. SANDS.